United States Patent Office 3,078,239
Patented Feb. 19, 1963

3,078,239
IMPROVED POLYETHER-URETHANE FOAMS AND PREPARATION OF SAME
George T. Gmitter, Akron, Ohio, assignor to The General Tire & Rubber Company, Akron, Ohio, a corporation of Ohio
No Drawing. Filed Jan. 8, 1959, Ser. No. 785,580
11 Claims. (Cl. 260—2.5)

This invention relates to an improved process for the preparation of rubbery polyurethane foamed products from the reaction between polyalkylene ether glycols and organic polyisocyanates. In the past, polyester-diisocyanate foams have been made by reacting a non-linear slightly branched polyester with a diisocyanate and a small amount of water or by reacting a linear polyester with a mixture of di- and tri-isocyanates and water. An excess of diisocyanate over that needed to react with the polyester to form the polyurethane was used to react with the water and to produce carbon dioxide for forming the cells in the solid product.

The diisocyanate, therefore, was added both to build up the polyester to a high molecular weight and also to crosslink the polyester sufficiently and to provide the excess carbon dioxide. Linear polymers alone did not generally change from the liquid state to the solid state quickly enough to trap the $CO_2$ gases evolved and thereby form a desirable foamed product. Therefore, a branching material was necessary to trap and hold gaseous carbon dioxide in order to obtain a low density cellular foamed polyurethane product.

Polyethers have also been proposed to replace polyesters in forming the polyurethane materials since the resultant foams have better resiliency and greater resistance to hydrolysis.

The polyalkylene ether glycols are generally of a low viscosity and water-like in nature so that it is advantageous to form a viscous but pourable prepolymer of the polyether and the polyisocyanate especially when a commercial foam machine is to be used to prepare the foam product.

However, the prepolymer formulation results in a heterogeneous mixture of many low molecular weight polyurethane polymers in an excess polyisocyanate and the properties of the resultant foams cannot be easily duplicated or controlled. Neither the prepolymer nor the resultant polyurethane foam material is a relatively definite and known composition so that duplication of results is difficult and a desired balance of all around properties in a foam used commercially cannot be accurately predetermined and subsequently produced.

Also generally the resultant exotherm of the prepolymer formulation is large and unpredictable so that premature gellation is likely to occur during the prepolymer preparation step and in storage thereafter before final processing since the prepolymer is generally a heterogeneous mixture of low molecular weight urethane polymers with little of the mixture being a high molecular weight urethane polymer.

It is an object of the present invention to produce a polyalkylene ether glycol/polyisocyanate prepolymer with a relatively high molecular weight and a more uniform molecular weight for subsequent conversion into improved polyurethane foams.

It is an object to provide a prepolymer mixture comprising a block polymer of a polyurethane formed from different units of polyisocyanate and polyether to provide a prepolymer composition that is definite and known so that properties of resultant foams may be predicted and duplicated.

These and other objects which will be apparent from the following description of the invention are accomplished by properly reacting a polyalkylene ether glycol and a diisocyanate so as to form a flowable or viscous dry partially reacted "pre-polymer" and subsequently by the addition of water, and a suitable catalyst to the previously mentioned dry "pre-polymer" may also be used to form the foam with some improvement in the gelling or solidification rate of the polymer.

I have found that it is important for the duplication of results that the polyether/polyisocyanate prepolymer be made so that its composition is known and, therefore, resultant crosslinking reactions during foaming can be more accurately controlled to form the foamed materials.

In preparing the dry prepolymer, the materials may be reacted in stages, for example, by first reacting the polyalkylene ether glycol with only a small amount of an organic diisocyanate or vice versa. Thus a molar ratio of glycol to diisocyanate of 2:1 up to 2:1.1 may be used to provide a few glycol units coupled with isocyanate of a given type. After this reaction another polyisocyanate may be added to change the character of the material or give a different coupling unit. Similarly, particularly when the polyether is not in excess additional polyether of the same or different type may be added to provide a change in the units along the polyurethane chain. Alternatively a viscous long chain product may be obtained by reacting nearly equal molar amounts of polyglycol and the polyisocyanate, which may then be reacted in one or more additional steps with the same or different polyisocyanates and an excess of isocyanate over glycol added prior to its mixture with water to form a foamed material. The highly viscous prepolymer prepared with near equal amounts of glycol and diisocyanate may also be mixed with one or more lower molecular weight polyurethanes prepared when the isocyanate is in substantial molar excess over the other to radically change the characteristics of the building blocks of the polyurethane chain of the sponge prepared from the prepolymer. Thus properties of the foamed materials may be predesigned and changed so as to alter the properties of the final product such as resiliency and flexibility at low temperatures.

It is thus seen that a prepolymer of definite and known composition can be prepared by either forming a block polymer of urethane or by making a high molecular weight polyurethane from about equal moles of a polyether and an organic diisocyanate and, thereafter adding excess polyisocyanate.

In either case the prepolymer mixture is homogeneous compared to the heterogeneous prepolymer mixture of the prior art where the polymers are of a relatively low molecular weight, say of 2000 to 12,000, and the molecular weight is not uniformly distributed. In contrast to this, the high molecular weight prepolymer or the block polymer of the present invention has a uniform weight distribution as of generally a much higher molecular weight, say of 15,000 to 20,000 or more up to 60,000 or even higher.

The viscosity of the prepolymer mixture generally may range from 1500 cps. (Brookfield) at 25° C. up to 100,000 cps. depending upon the types of glycols and diisocyanates used. Higher viscosity prepolymers may require heating to 150° F.–175° F. or thereabout to permit better flow while being pumped in a commercial foam machine.

The polyether glycol used as raw materials in the present invention may, if reasonably dry, be used as received or preferably may be pre-treated by heating to about 100° C. under a vacuum to eliminate any substantial amounts of water. The glycol which should preferably have a molecular weight above 750 may be dried by any suitable means if the water content is substantial.

The polyalkylene glycols have the general formula:

$$HO(RO)_n-H$$

where R represents divalent aliphatic radicals such as methylene, ethylene, propylene, butylene, isopropylene, isobutylene, etc. or aromatic hydrocarbon radicals such as phenylene and the aliphatic or aromatic radicals may be the same or different. The integer represented by $n$ is such that the average molecular weight of the polyether glycol is greater than 750. In accordance with the present invention, benefits are obtained when the molecular weight is greater than 750 and preferably is around 2000 to 4000 or 5000 although improved products are obtained when the molecular weight of the polyether glycol is as high as 10,000.

These polyether glycols as well known may be prepared by the polymerization or copolymerization of compounds like ethylene oxide, propylene oxide, butylene oxides, tetrahydrofuran, styrene oxide, epichlorohydrin, etc. and are generally available commercially.

Among bifunctional isocyanates which may be used are hexamethylene diisocyanate; toluene diisocyanate; phenylene diisocyanate; 2,4-tolylene diisocyanate and 2,6-tolylene diisocyanate and mixtures of any of these diisocyanates.

In the preparation of these foams a mole of polyalkylene ether glycol is first reacted with from 1.1 to 2.1 moles of an organic diisocyanate to provide a higher molecular weight polyurethane containing some free NCO groups. Some unreacted diisocyanate may also be present. This product will hereafter be referred to as a "prepolymer."

The total amount of organic diisocyanate or mixture di- and tri-isocyanates used to form a prepolymer mixture with free isocyanate groups and containing high molecular weight polyurethanes for subsequent conversion into a foam is preferably about 2 to 6 mole equivalent weights of polyisocyanate per mole equivalent weight of polyether although from 1.1 to 12 equivalents may be used.

This prepolymer is then mixed with a small amount of water, a crosslinking compound containing a plurality of active hydrogens and a catalyst. The crosslinking agent must for certain processing advantages, when the prepolymer is formed of wholly bifunctional reactants, comprise a polyfunctional material to entrap $CO_2$. Thorough mixing of these ingredients gives rise to a flexible foam which shows improved resiliency along with better humidity aging properties. Resiliency is not decreased with wringing of the foam so that the foam stands up well under flexing conditions.

As representative of crosslinking compounds containing a plurality of active hydrogens, there are included organic polyols, such as trimethylol propane; glycerol; 1,2,4-butanetriol; hexanetriol; "Triol 230" which is the beta ethanol ether of 2 methyl-, 2 methylol-, 4 methyl-, 5 hydroxy pentane; "Quadrol" which is N,N,N',N'-tetrakis (2-hydroxypropyl)ethylenediamine; polyamines such as triamines and tetramines including hexamethylene tetramine, ethylene diamine, etc.

The amounts of crosslinking agent used may be varied widely depending on the stiffness of the sponge desired. When less than 0.5 part per 100 parts by weight of organic reactants (polyether and polyester plus isocyanate etc.) is used the foam is often too soft or insufficiently cured for most purposes usually at least 1% to 5 or 6% of the total of polyester-polyether and isocyanate present is used and up to 10 percent is sometimes used in some rigid foams and up to 20% in certain rigid foams may be present.

The amount of water used in accordance with the present invention is dependent to some extent on the characteristics of the foam desired. The amount of water used should, I have found, preferably be about 0.7 to 1.5% of the weight of the prepolymer although as little as 0.5% and as much as 2.5% may be used in some instances. More than 5.0% of water causes excessive formation of polyurea linkages.

As representative catalysts for the diisocyanate-polyether reaction, there are tertiary amines such as alkyl amino alcohols having a free hydroxyl group on a carbon atom beta to the nitrogen of which dibutyl amino alcohol and butyl diethanol amine are preferred; ordinary alkyl tertiary amines such as trihexylamine, tributyl amine or tripropyl amine; morpholines such as N-methyl morpholine or N-octyl morpholine and pyridine compounds such as 4-pyridine propanol and 4-n-amyl pyridine. Organo metallic compounds such as cobalt and nickel naphthenates and linoleates, etc. are also useful catalysts. Generally alkyl tertiary amines give faster acceleration than amine alcohols or morpholines or pyridines. Mixtures of alkyl tertiary amines with either morpholines or amino alcohols or pyridine compounds are preferred to give a slower acceleration.

The amount of catalyst used is generally about .5% to 2% of the weight of the prepolymer. When the amount of the catalyst is less than 0.5% particularly when no tertiary amine is present the reaction is generally too slow for economy and when much more than 3 or 4% of the catalyst is used, waste of catalyst and deterioration in quality may result.

The presence of substantial quantities of one or more silicone oils are essential to the preparation of commercially acceptable polyether-urethane foams. I have been unable to obtain much blow let alone control cell size or obtain a uniform pore size without using substantial amounts of a silicone oil as hereinafter more fully described.

I have found that polyether urethanes require relatively large amounts of silicone oil, i.e. at least .1% of the weight of the polymer of polyether and isocyanate to increase stability of the polyether and 0.25% to 1% is even better. While extremely small amounts of silicone oils have been incorporated in polyester urethanes, the effect there is quite different as silicone oil acts only to control pore size. Further, polyester urethane foams may be produced without any of the silicone oil. The amounts used in polyester-urethane foams are around .01% or even less and the polyester foams are extremely and adversely sensitive to substantial amounts of silicone oil.

When apparatus previously used for making polyether urethane foam is used for making polyester urethane foam without solvent cleaning the apparatus the foam has substantially collapsed showing that the effect of silicone oil in polyester urethane is not stabilizing but rather defoaming. In polyether foams the effect of larger amounts of silicone oil is surprisingly opposite, the effect being to stabilize the polyether-urethane foam and to permit the formation of an article of low-density.

Silicone oils that markedly improve the cell structure of polyether-urethane foams are polyorgano siloxanes such as liquid polyalkyl siloxanes including polydimethyl and polydiethyl siloxanes, polydipropyl siloxanes, and liquid polaryl siloxanes including polydiphenyl siloxane or mixed polyarylalkyl siloxanes such as polymethylphenyl siloxanes or liquid mixtures of one or more of such siloxanes.

In accordance with the above, oily siloxanes polymers having recurring units of the following structure are useful in the present invention:

where $R_1$ and $R_2$ are hydrocarbon radicals having 1 to 6 carbon atoms such as methyl, ethyl, propyl, butyl, isopropyl, hexyl, and phenyl. $R_1$ and $R_2$ may be the same radical or different radicals. The siloxane polymers are generally terminated with a

group although part or all of the methyl groups may be substituted for by other alkyl groups such as ethyl and propyl or an aryl radical such as phenyl. The terminal groups in the preparation of dimethyl siloxane polymers are the —Si(CH$_3$)$_3$ groups.

For best results of uniformity of pore size, the silicone oil should be polydimethyl siloxane. One particularly effective silicone oil is "Dow Corning-200 Fluid"-silicone oil which is a liquid water white dimethyl siloxane polymer generally having a viscosity of about 50 centistokes at 25° C. and a pour point of —67° F. (ASTM D–97–39 Sections 5 to 7). Another very effective silicone oil General Electric SF 96 (100) silicone fluid which is a dimethyl siloxane polymer having a viscosity at 100° F. of 100 centistokes, a pour point of —53° F. and a specific gravity (20/20° C.) of 0.965.

The viscosity of the siloxane polymer used is of importance. The lower viscosity silicone oils are more effective and may be used in smaller amounts to obtain the effects of larger amounts of the higher viscosity silicone oils. Whatever the reason for the outstanding results obtained, generally I have found that silicone oils having a viscosity range of about 10 to 400 or 500 centistokes at 25° C. provide the resultant foams with the best cell structure as well as other valuable properties when used in the lower range above specified. I most frequently use silicone oils of about 10 to about 100 centistokes viscosity. Generally those siloxane polymers having a low viscosity less than about 5 centistokes at 25° C. are undesirable.

Even though larger amounts of silicone oils are required for the higher viscosity oils, difficulty in mixing is had with viscosities above about 1000 centistokes at 25° C. Apparently these more viscous siloxane polymers cannot be sufficiently dispersed unless used with some solvent to operate as effective pore size controllers. Small amounts of solvent, on the other hand may create foaming difficulties because of their high vapor pressure.

Again even though different amounts of silicone oils of different viscosities are preferably used as low as 0.1% of any provides a noticeable improvement in stability and as much as 2 percent by weight based on the weight of the prepolymer has been used. The maximum amount is determined by economy. About .5 to 1 percent provides the resultant foam with the excellent cell structure, and is generally preferred.

The following examples are used to illustrate invention and not to limit it in any way:

Example 1

This example illustrates a method of making an improved foam polyurethane material in which a high molecular weight polymer of a urethane having a more uniform molecular weight distribution is used as the prepolymer. In this manner it is possible to start with a known high molecular weight prepolymer in a mixture having excess isocyanate groups so that the crosslinking reaction during foaming can be better controlled.

A prepolymer was prepared according to the following recipe:

| Ingredients | Parts by Weight, Grams |
| --- | --- |
| Polytetramethylene ether glycol | 560 (0.2 mole). |
| 2,4-Toluene diisocyanate | 35 (0.2 mole). |
| 80/20 mixture of 2,4 and 2,6-toluene diisocyanates | 150. |

The 0.2 mole of glycol and 0.2 mole of 2,4-toluene diisocyanate were mixed and heated for about seven hours at a temperature of 65 to 70° C. to form a relatively high molecular weight urethane polymer. At the end of the seven hour period the 80/20 mixture of toluene diisocyanate was added to the still liquid polyurethane and the mixture stirred until uniform in consistency. The viscosity of the prepolymer mixture was 72,000 cps. at 27° C. Prepolymer thus prepared was reacted in a half gallon container with rapid stirring using a laboratory stirrer to produce a foam according to the following formulation:

| Ingredients | Parts by Weight, Grams |
| --- | --- |
| Prepolymer | 100 |
| Silicone Oil (polydimethyl silozane having a viscosity of 100 centistokes at 25° C.) | 1 |
| Triethylamine | 1 |
| Water | 2 |

The properties of the resultant foam was compared with a control material made from a prepolymer of 560 grams polytetramethylene ether glycol and 185 grams of an 80/20 mixture of 2,4- and 2,6-toluene diisocyanates which were mixed and reacted in one step. The results of tests conducted on the cured foam are as follows:

| Properties | Foam of Example 1 | Control Foam |
| --- | --- | --- |
| Compression Set, percent | 8 | 12 |
| Density, lbs. per sq. inch | 2.5 | 2.5 |
| 25H Compression Deflection, lbs. (10 sq. inch) | 5.5 | 12 |
| Rebound (Schopper), percent | 48 | 37 |

As seen in the above table, the all around properties of the foam prepared according to the present invention are outstanding compared to a foam prepared from the prepolymer of the prior art.

Example 2

This example illustrates the improved foams prepared by a method in which a block polymer of urethane is made having excessive polyisocyanate which is used to provide a prepolymer for making an improved polyurethane foam.

A prepolymer is prepared according to the following recipe:

| Ingredients | Parts by Weight |
| --- | --- |
| Polypropylene glycol (molecular weight 2,000). | 800 grams (0.4 mole). |
| 80/20 mixture of 2,4- and 2,6-Toluene Diisocyanate. | 140 grams (0.8 mole). |
| Polytetramethylene Ether Glycol (molecular weight 2,600). | 2,080 grams (0.8 mole). |
| 80/20 mixture of 2,4- and 2,6-Toluene Diisocyanate. | 840 grams. |

The 0.4 mole of polypropylene glycol and the 0.8 mole of 80/20 mixture of 2,4- and 2,6- toluene diisocyanates were first mixed and heated at 40 to 50° C. for one hour. Then the 2080 grams of polytetramethylene ether glycol were added and the resultant mixture reacted at about 40° C. for one-half hour. Then the 840 grams of 80/20 mixture of 2,4- and 2,6-toluene diisocyanate were added and the resultant mixture heated to 100° C. and reacted for one hour. The percent NCO content of the resultant prepolymer mixture was 9.3 and the viscosity was 4,450 cps. at 25° C.

The resultant prepolymer was then reacted to form a foamed polyether-urethane material according to the following recipe:

75 grams prepolymer
0.8 gram silicone oil (viscosity of 100 centistokes at 25° C.)
0.5 gram triethylamine
1.6 grams water Properties of the resultant foam which was cured overnight at 80° C. are set forth as follows:

| Properties | Foam of Example 2 | Control Foam |
| --- | --- | --- |
| Foam density, lbs. per cu. ft. | 2.7 | 2.5 |
| Compression Set, percent | 6.5 | 12 |
| 25% Compression Deflection (10 sq. inches) | 4.8 | 12 |
| Percent Rebound | 46 | 37 |

When the properties of the foam of Example 2 is compared to those of a control foam, it is seen that the foam of Example 2 is outstanding. The control foam was made by reacting 500 grams of polypropylene ether glycol having a molecular weight of 2000 and 180 grams of a 80/20 mixture of 2,4- and 2,6-tolylene diisocyanates in one step and not by a block building process. The resulting prepolymer was reacted with water, silicone oil, and amine catalyst just as set forth for the foam of Example 2.

*Example 3*

A prepolymer was formed in a manner similar to that described in Example 2 according to the following recipe:

(1) 300 grams (0.15 mole) polypropylene ether glycol having a molecular weight of 2000 (PPG 2025)
(2) 48 grams (0.3 mole) meta phenylene diisocyanate
(3) 600 grams (0.3 mole) PPG 2025
(4) 48 grams (0.3 mole) meta phenylene diisocyanate
(5) 600 grams (0.3 mole) PPG 2025
(6) 500 grams (80/20 mixture of 2,4- and 2,6-toluene diisocyanates The ingredients marked 1 and 2 were mixed and reacted for 45 minutes at a temperature starting from 35° C. up to 90° C. at the end of the 45 minute period. The reactant (3) was added and the resultant mixture heated for one-half hour at 90° C. Thereafter the other ingredients, namely, 4, 5 and 6 were alternately added and reacted for one-half hour periods at 90° C. to form a block copolymer having various units of polyether and polyisocyanate. The viscosity of the resultant prepolymer mixture, which was still liquid, was 5600 cps. at 24° C. The resultant prepolymer was then reacted with water, a tertiary amine reaction catalyst and silicone oil according to the following recipe:

75 grams prepolymer
10 drops polydimethyl siloxane having a viscosity of 500 centistokes at 25° C.
2 grams N-methyl morpholine
1.5 grams water The density of the resultant foam was 2.6 lbs. per cu. ft. The all around properties of the foam were outstanding including a percent rebound of 46.

While generally it takes polyurethane foam such as the Control Foam of Example 1 about 2 to 3 days to reach a stabilized compression set value, the foams prepared according to Examples 2 and 3 reached desired compression set values in a short time, even less than 24 hours. This rapid stabilization of compression set value is advantageous in factory operations because long storage periods between preparation of the foams and final fabrication into an article can be eliminated.

Also the foams made from the block polymers according to the present invention can be easily varied in order to obtain a particular desired property such as increased flexing or increased low temperature performance. Apparently at least part of the improvement in the resultant foams made from block polyurethane prepolymers is due to the less vigorous exotherm in the final foaming reaction since the resulting exotherm during each step of the block building process is small and the final cross-linking reaction is easier controlled and premature gelling is largely eliminated.

Generally the stability of the prepolymer mixtures of the prior art is poor, the premature gellation leading to very viscous mixtures in one to two months. However, the viscosity of the block prepolymer mixture of Example 3 remained unchanged even after 4 months.

While the above examples are primarily concerned with the laboratory preparation of foams by means of the described method, it is possible that these foams may be prepared by the rapid, common mixing of the separate components in a commercial foam machine, such as the usual mixing method of making cellular polyurethane wherein ordinarily a viscous liquid polyether/polyisocyanate prepolymer is pumped at a controlled rate through a nozzle. An activator mixture comprising water, a tertiary amine catalyst and a silicone oil is also pumped at an extremely high pressure to the nozzle, where it contacts the stream of polyether prepolymer and is thoroughly mixed therewith because of its high velocity. A small amount of water is, thus, usually also introduced into the nozzle either as a jet stream by itself or in admixture with the polyether prepolymer. The catalyst, such for example as a tertiary amine or a mixture as above mentioned, is also preferably mixed with the water or can be introduced into the nozzle in the prepolymer component. A stirrer may be present in the nozzle to insure homogeneous mixing. From the nozzle, the material is deposited as a layer into a relatively moveable mold which is moved in a continuous manner relative to the nozzle in order to provide the desired layer of viscous reactants on the bottom thereof. Thus, it is apparent that the process of the present invention can be used with any of the usual mixing procedures of making foamed polyurethanes without requiring expensive and undesirable alterations.

Dry polyether glycols may also be pre-reacted with organic triisocyanates to form a dry "prepolymer." This "prepolymer," then, in accordance with this invention, when subsequently reacted with water, silicone oil and a tertiary amine catalyst also produces unusually resilient humidity aging resistant polyurethane foams.

Block polyurethane prepolymers may also be prepared by reacting polyalkylene ether triols with organic diisocyanates in the proper molar equivalent ratios using the same mole equivalent weight ratios already discussed in the case of the glycols. Polyether glycols may be used in subsequent stage reactions to provide greater latitude in the nature of the prepolymer chain. Suitable polyalkylene ether triol starting materials are condensation products of an alkylene oxide of preferably 2 to 4 carbon atoms and a polyhydric alcohol of less than 7 carbon atoms and having 3 to 6 hydroxyl groups such as glycerol, pentaerythritol, hexane triol-1,2,6 and trimethylol propane. Such polyether glycols, having molecular weights of at least 750 are branched in nature and terminated with hydroxyl groups. Condensation products from mixtures of ethylene and propylene oxides are particularly useful in producing improved foamed polyurethanes for cushioning applications.

Generally, the branched polyether glycols with primary hydroxyl terminal groups are preferred. Preferred branched polyether glycols with the terminal hydroxyl groups may be formed by condensing propylene oxide and/or a mixture of propylene oxide and ethylene oxides with about 0.1 to 10 mol percent based on the alkylene oxides of a polyhydric alcohol such as glycerol, trimethylol propane and/or hexane triol-1,2,6. At the end of the condensation of the above, ethylene oxide is condensed with the resultant product to provide primary hydroxy groups at ends of the branches. Two to four moles or so of ethylene oxide or even of propylene oxide-1,3 is usually desired for reaction with the first condensation product to provide a branched polyether with a preferred number of primary hydroxyl groups.

Thus, the polyalkylene ether glycols used in Examples 2 and 3 may be substituted in whole or part by the polyalkylene ether triols.

It has been found that a cure at above normal temperatures such as in the neighborhood of about 70° C. to 110° C. for a short time is advantageous after the foam has risen to its maximum. Wringing of the products having alkyl amino, N-hydrocarbon substituted morpholine, and/or alkyl or alkyl alcohol substituted pyridine tertiary amine catalysts at intermediate stages during the treatment or at any time after the tacky stage has passed gives the surprising result of greatly increasing the resistance of the foam to humidity aging which is particularly true when wringing is followed by further curing for a few minutes. Several passes through wringer rolls to break bubbly structure and remove entrapped gas give great improvement.

This application is a continuation-in-part of my co-pending application Serial No. 626,313 filed Dec. 5, 1956, now abandoned and my copending application Serial No. 707,351 filed Jan. 6, 1958, now abandoned.

It is also apparent that in accordance with the provisions of the patent statutes modifications of the invention may be made without changing the spirit thereof.

What I claim is:

1. The method which comprises (1) reacting a polyether glycol with an organic diisocyanate in an amount at least sufficient to provide a polyether urethane having terminal isocyanato groups, (2) reacting said polyurethane with additional polyether glycol in an amount sufficient to increase the molecular weight of and to provide said polyether urethane with terminal hydroxy groups, and (3) reacting the product of (2) with additional organic diisocyanate in an amount at least sufficient to increase the molecular weight of and to provide the product of (2) with terminal isocyanato groups, said polyether glycol having a molecular weight of from about 750 to 10,000, the total mol ratio of said polyether glycol to said organic diisocyanate being from about 1:1.1 to 1:12.

2. The method which comprises (1) reacting an organic diisocyanate with a polyether glycol in an amount sufficient to provide a polyether urethane having terminal hydroxy groups, (2) reacting said polyether urethane with additional organic diisocyanate in an amount sufficient to increase the molecular weight of and to provide said polyether urethane with terminal isocyanato groups, (3) reacting the product of (2) with additional polyether glycol in an amount at least sufficient to increase the molecular weight of and to provide the product of (2) with terminal hydroxy groups, and (4) reacting the product of (3) with additional organic diisocyanate in an amount at least sufficient to increase the molecular weight of an to provide the product of (3) with terminal isocyanato groups, said polyether glycol having a molecular weight of from about 750 to 10,000, the total mol ratio of said polyether glycol to said organic diisocyanate being from about 1:1.1 to 1:12.

3. The method for making a block urethane prepolymer which comprises (1) reacting about 2 moles of an aromatic diisocyanate with 1 mol of a polyalkylene ether glycol, (2) reacting the product of (1) with about 2 moles of a polyalklene ether glycol, (3) reacting the product of (2) with about 2 moles of an aromatic diisocyanate, (4) reacting the product of (3) with about 2 moles of a polyalkylene ether glycol, and (5) reacting the product of (4) with additional aromatic diisocyanate in an amount at least sufficient to increase the molecular weight of and to provide the product of (4) with terminal isocyanato groups and with excess aromatic diisocyanate, said polyalkylene ether glycol having a molecular weight of from about 1500 to 5000, the total mol ration of said polyalkylene ether glycol to said aromatic diisocyanate being from about 1:2 to 1:6, the product of (5) having a viscosity of from 1500 to 100,000 cps. (Brookfield) at 250° C.

4. The method which comprises forming a block polyether urethane by (1) reacting a polyether glycol and an organic diisocyanate in an amount at least sufficient to provide a polyether urethane having terminal isocyanato groups, (2) reacting said polyurethane with additional polyether glycol in an amount sufficient to increase the molecular weight of and to provide said polyether urethane with terminal hydroxy groups, and (3) reacting the product of (2) with additional organic diisocyanate in an amount at least sufficient to increase the molecular weight of and to provide the product of (2) with terminal isocyanato groups and with excess organic diisocyanate and to form a block polyether urethane, said polyether glycol having a molecular weight of from about 750 to 10,000, the total mol ratio of said polyether glycol to said organic diisocyanate being from about 1:1.1 to 1:12, mixing said block polyether urethane with water, a catalyst for the urethane foaming reaction, and a silicone oil in an amount sufficient to cause foaming of said block polyether urethane, and foaming said block polyether urethane, said silicone oil being selected from the group consisting of polydialkyl-, diaryl- and dialkylaryl-siloxanes having a viscosity of from about 10 to 1000 centistokes at 25° C.

5. The method which comprises making a block polyalkylene ether urethane by (1) reacting about 2 moles of an aromatic diisocyanate with 1 mole of a polyalkylene ether glycol, (2) reacting the product of (1) with about 2 moles of a polyalkylene ether glycol, (3) reacting the product of (2) with about 2 moles of an aromatic diisocyanate, (4) reacting the product of (3) with about 2 moles of a polyalkylene ether glycol, and (5) reacting the product of (4) with additional aromatic diisocyanate in an amount at least sufficient to increase the molecular weight of and to provide the product of (4) with terminal isocyanato groups and with excess aromatic diisocyanate and to provide a block polyalkylene ether urethane, said polyalkylene ether glycol having a molecular weight of from about 1500 to 5000, the total mol ratio of said polyalkylene ether glycol to said aromatic diisocyanate being from about 1:2 to 1:6, said block polyalkylene ether urethane having a viscosity of from 1500 to 100,000 cps. (Brookfield) at 25° C., mixing with said block polyalkylene ether urethane from 0.5 to 5.0% by weight of water, from 0.5 to 4% by weight of a tertiary amine catalyst and from 0.1 to 2.0% by weight of a silicone oil, and foaming said polyalkylene ether urethane, the weights of said water, said catalyst and said silicone oil being based on the weight of said block polyalkylene ether urethane, said silicone oil being selected from the group consisting of polydialkyl, diaryl and dialkyl aryl-siloxanes having a viscosity of from about 10 to 1000 centistokes at 25° C.

6. The method according to claim 5 in which there is additionally mixed with said block polyalkylene ether urethane, water, catalyst and silicone oil prior to foaming from about 1 to 5% by weight based on the weight of said block polyalkylene ether urethane of a crosslinking agent having from 2 to 14 carbon atoms and being selected from the group consisting of aliphatic polyols having from 3 to 4 hydroxyl groups and aliphatic amines having from 2 to 4 amino groups.

7. The method for making a block urethane prepolymer which comprises (1) reacting about 2 moles of a polyether glycol with 1 mole of a member of the group consisting of (a) an organic diisocyanate and (b) a polyetherurethane formed by reacting about 2 moles of an organic diisocyanate with 1 mole of a polyether glycol, (2) reacting 1 mole of the product of (1) with about 2 moles of an organic diisocyanate, (3) reacting the product of (2) with an amount of a polyether glycol sufficient to provide a polyetherurethane having terminal hydroxy groups, and (4) reacting the product of (3) with additional organic diisocyanate to provide said last-named product with terminal isocyanato groups, said prepolymer having a viscosity of at least 1500 centipoises at 25° C.

8. The product produced by the method of claim 7.

9. The method which comprises forming a block polyetherurethane by (1) reacting an organic diisocyanate with an amount of a member of the group consisting of (a) a polyether glycol and (b) a polyetherurethane formed by reacting 1 mole of an organic diisocyanate with about 2 moles of a polyether glycol, sufficient to provide a polyetherurethane having terminal isocyanato groups, (2) reacting said last-named polyetherurethane with additional polyether glycol in an amount sufficient to increase the molecular weight of and to provide said polyetherurethane with terminal hydroxy groups, and (3) reacting the product of (2) with additional organic diisocyanate in an amount at least sufficient to increase the molecular weight of and to provide the product of (2) with terminal isocyanato groups and with excess organic diisocyanate and to form a block polyetherurethane, said polyether glycol having a molecular weight of from about 750 to 10,000, the total mole ratio of said polyether glycol to said organic diisocyanate being from about 1:1.1 to 1:12, mixing said block polyetherurethane with water, a catalyst for the urethane foaming reaction, and a silicone oil in an amount sufficient to cause foaming of said block polyetherurethane, and foaming said block polyetherurethane, said silicone oil being selected from the group consisting of polydialkyl-, diaryl- and dialkyl-aryl-siloxanes having a viscosity of from about 10 to 1000 centistokes at 25° C.

10. The product produced by the method of claim 9.

11. The method which comprises (1) reacting a polyalkylene ether polyol having 2 to 3 terminal hydroxyl groups with an organic diisocyanate in an amount sufficient to provide a polyether urethane having terminal isocyanato groups, (2) reacting said polyurethane with a polyether glycol in an amount sufficient to increase the molecular weight of and to provide said polyether urethane with terminal hydroxyl groups, and (3) reacting the product of (2) with additional organic diisocyanate in an amount at least sufficient to increase the molecular weight of and to provide the product of (2) with terminal isocyanato groups, said polyether glycol having a molecular weight of from about 750 to 10,000, the total mol ratio of said polyether glycol to said organic diisocyanate being from about 1:1.1 to 1:12.

References Cited in the file of this patent

UNITED STATES PATENTS

| | | |
|---|---|---|
| 2,850,464 | Mitchell | Sept. 2, 1958 |
| 2,866,774 | Price | Dec. 30, 1958 |
| 2,871,226 | McShane | Jan. 27, 1959 |
| 2,871,227 | Walter | Jan. 27, 1959 |
| 2,879,233 | Pace | Mar. 24, 1959 |
| 2,888,411 | Pace | May 26, 1959 |
| 2,901,445 | Harris | Aug. 25, 1959 |

UNITED STATES PATENT OFFICE
CERTIFICATE OF CORRECTION

Patent No. 3,078,239                          February 19, 1963

George T. Gmitter

It is hereby certified that error appears in the above numbered patent requiring correction and that the said Letters Patent should read as corrected below.

Column 9, line 50, for "an" read -- and --; line 68, for "ration" read -- ratio --; same column 9, line 72, for "250° C." read -- 25° C. --.

Signed and sealed this 1st day of October 1963.

(SEAL)
Attest:

ERNEST W. SWIDER                          DAVID L. LADD
Attesting Officer                             Commissioner of Patents